(12) United States Patent
Glynn

(10) Patent No.: US 10,264,046 B2
(45) Date of Patent: *Apr. 16, 2019

(54) TRANSITION POINTS IN AN IMAGE SEQUENCE

(71) Applicant: Pixar, Emeryville, CA (US)

(72) Inventor: Dominic Glynn, Berkeley, CA (US)

(73) Assignee: Pixar, Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,224

(22) Filed: Jun. 28, 2017

(65) Prior Publication Data

US 2017/0302720 A1    Oct. 19, 2017

Related U.S. Application Data

(63) Continuation of application No. 13/958,268, filed on Aug. 2, 2013, now Pat. No. 9,756,101.

(51) Int. Cl.
*H04L 29/06* (2006.01)
*H04N 21/2343* (2011.01)
*H04N 21/24* (2011.01)
*H04N 21/845* (2011.01)

(52) U.S. Cl.
CPC ........ *H04L 65/604* (2013.01); *H04L 65/4084* (2013.01); *H04L 65/60* (2013.01); *H04L 65/601* (2013.01); *H04L 65/602* (2013.01); *H04L 65/80* (2013.01); *H04N 21/2343* (2013.01); *H04N 21/2402* (2013.01); *H04N 21/8455* (2013.01)

(58) Field of Classification Search
CPC ..... H04L 65/60; H04L 65/80; H04L 65/4084; H04L 65/604; H04L 65/601; H04L 65/602; H04N 21/2402; H04N 21/8455; H04N 21/2343
See application file for complete search history.

(56) References Cited

U.S. PATENT DOCUMENTS

| 7,907,616 | B1 | 3/2011 | Breau et al. |
| 8,307,401 | B1 | 11/2012 | Lida |
| 8,903,897 | B2* | 12/2014 | Relan ............... H04L 67/34 709/203 |
| 9,324,375 | B1 | 4/2016 | Casalena et al. |
| 9,326,012 | B1 | 4/2016 | Dorwin |
| 9,756,101 | B2* | 9/2017 | Glynn ............... H04L 65/60 |
| 2004/0240390 | A1 | 12/2004 | Seckin |
| 2007/0183498 | A1 | 8/2007 | Nakashima |
| 2007/0195878 | A1 | 8/2007 | Bruls et al. |
| 2008/0084927 | A1 | 4/2008 | Rosenzweig et al. |

(Continued)

FOREIGN PATENT DOCUMENTS

EP    1843592 A1 *  10/2007 ....... H04N 21/44218

*Primary Examiner* — Ramy M Osman
(74) *Attorney, Agent, or Firm* — Patterson + Sheridan, LLP

(57) ABSTRACT

Techniques are proposed for embedding transition points in media content. A transition point system retrieves a time marker associated with a point of interest in the media content. The transition point system identifies a first position within the media content corresponding to the point of interest. The transition point system embeds data associated with the time marker into the media content at a second position that is no later in time than the first position. The transition point system causes a client media player to transition from a first image quality level to a second quality level based on the time marker.

20 Claims, 7 Drawing Sheets

(56) References Cited

U.S. PATENT DOCUMENTS

| | | |
|---|---|---|
| 2010/0121974 A1 | 5/2010 | Einarsson et al. |
| 2010/0150245 A1 | 6/2010 | Camp, Jr. et al. |
| 2011/0176496 A1 | 7/2011 | Roy et al. |
| 2012/0011552 A1 | 1/2012 | Yao |
| 2012/0066355 A1* | 3/2012 | Tiwari ............... H04L 65/4084 709/220 |
| 2012/0141089 A1 | 6/2012 | Hunt |
| 2012/0254457 A1 | 10/2012 | Condon et al. |
| 2012/0314759 A1* | 12/2012 | Huang ............... H04N 21/2343 375/240.02 |
| 2013/0013671 A1* | 1/2013 | Relan ..................... H04L 67/34 709/203 |
| 2013/0036201 A1 | 2/2013 | McLaughlin |
| 2013/0144906 A1* | 6/2013 | Bhupalam ............. H04L 65/602 707/771 |
| 2013/0227158 A1 | 8/2013 | Miller et al. |
| 2013/0304458 A1* | 11/2013 | Shavit .................... G10L 19/22 704/205 |
| 2014/0282690 A1 | 9/2014 | Keohane et al. |
| 2015/0039778 A1 | 2/2015 | Glynn |
| 2017/0302720 A1* | 10/2017 | Glynn .................... H04L 65/80 |

\* cited by examiner

TRANSITION POINTS IN AN IMAGE SEQUENCE

CROSS-REFERENCE TO RELATED APPLICATIONS

This application is a continuation of co-pending U.S. patent application Ser. No. 13/958,268, filed Aug. 2, 2013, which is herein incorporated by reference in its entirety.

BACKGROUND OF THE INVENTION

Field of the Invention

The present invention relates to the field of streaming media and, in particular, to transition points in an image sequence.

Description of the Related Art

Streaming media often involves delivering some combination of audio, video, and text in a continuous manner from a content provider to a client media player via a communications channel. Examples of streaming media include video, audio, closed caption text, and movies that include video, audio, and closed caption text in a single media stream. The client media player presents the streaming media to an end-user via a suitable playback mechanism. In general, streaming media, such as a movie, is viewed at a target frame rate that is more or less constant, where the target frame rate is the number of image frames presented per unit of time, such as 60 frames per second. The streaming media is compressed and encoded so as to provide an acceptable image quality level at the desired frame rate, within the confines of the available bandwidth of the communications channel.

During playback of the streaming media, the bandwidth of the communications channel that is available for playback of the streaming media may vary dynamically. Such dynamic changes of available bandwidth may result from a various causes, including increases or decreases in the throughput of the communications channel, other demands on the communications channel, download requests or streaming media associated with other client media players, and the rendering demands and capability of the client media player. Generally, delivering streaming media at a constant frame rate with a variable quality level is considered preferable to delivering streaming media at a variable frame rate with a constant quality level. Accordingly, if the available bandwidth decreases, then the content provider may deliver streaming media at a higher compression level, corresponding to lower bandwidth consumption at a lower image quality level. If the available bandwidth increases, then the content provider may deliver streaming media at a lower compression level, corresponding to higher bandwidth consumption at a higher image quality level. The image quality level of the streaming media dynamically increases or decreases, responsive to dynamic changes in the available bandwidth of the communications channel.

One drawback with this approach is that changes in image quality level occur based on available bandwidth of the communication channel without regard to the quality or continuity of the viewing experience over time. For example, a change in image quality level could occur at a particularly noticeable point during a movie or during a particularly important scene, resulting in a compromised viewing experience for the end-user.

SUMMARY OF THE INVENTION

One embodiment of the present invention includes a method for embedding transition points in media content. The method includes retrieving a time marker associated with a point of interest in the media content. The method further includes identifying a first position within the media content corresponding to the point of interest. The method further includes embedding data associated with the time marker into the media content at a second position that is no later in time than the first position. The method further includes causing a client media player to transition from a first image quality level to a second quality level based on the time marker.

Other embodiments include, without limitation, a computer-readable storage medium that includes instructions that enable a processing unit to implement one or more aspects of the disclosed methods as well as a computing system configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
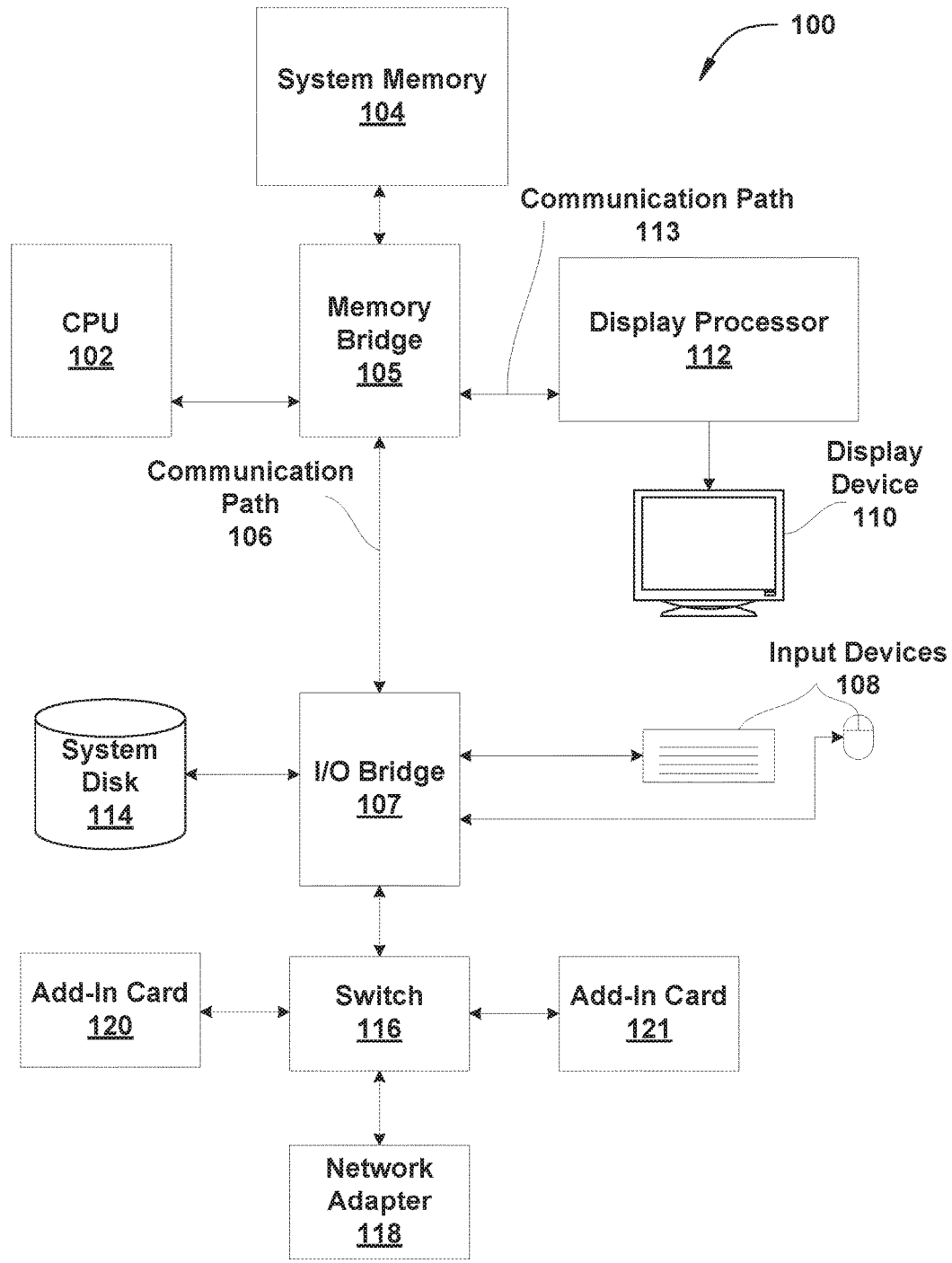
FIG. 1 is a block diagram of a system configured to implement one or more aspects of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Hardware Overview

FIG. 1 depicts one architecture of a system 100 within which embodiments of the present invention may be implemented. This figure in no way limits or is intended to limit the scope of the present invention.

System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs, in the case of stereoscopic images. The data and/or instructions defining the desired output images can be stored in system memory 104 or graphics memory within display processor 112. For example, CPU 102 could execute a client media player application (not shown) that receives a media stream from a content provider, and transmits the media stream to the display processor 112 for viewing on the display device 110. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
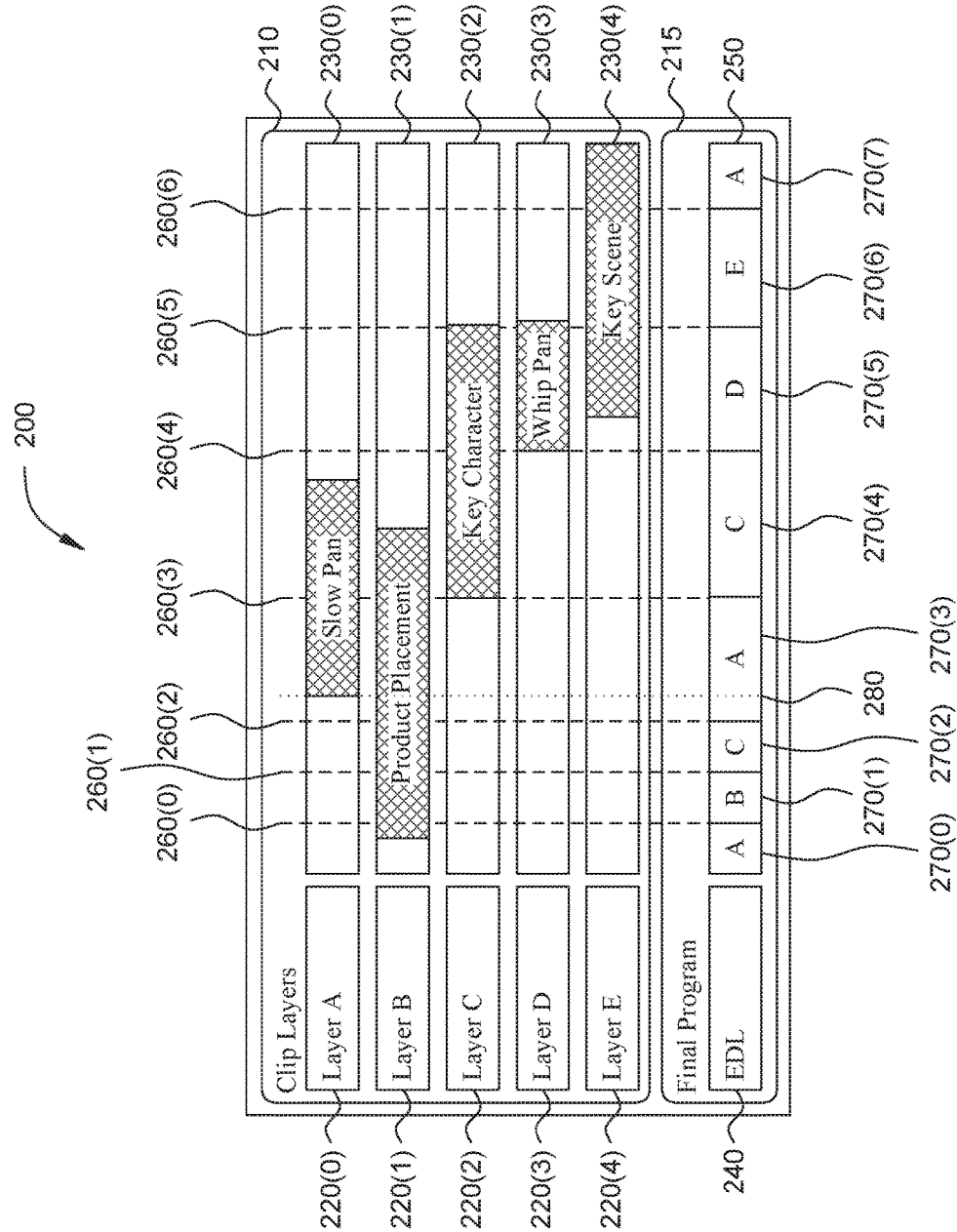
FIG. 2 illustrates a layout of movie clips associated with transition points, according to one embodiment of the present invention.

FIG. 2 illustrates a layout 200 of movie clips associated with transition points, according to one embodiment of the present invention. As shown, the layout 200 includes clip layers 210 and a final program 215.

The clip layers 210 illustrate individual pieces of media, such as video or audio that may contribute to the final program 215. As shown, the clip layers 210 include layer identifiers 220 and media clips 230. Each of the clip layers 210 may include one or more regions where an image quality transition is preferable or not preferable.

Layer identifier 220(0) corresponds to a media clip 230(0) that includes a section where the camera performs a slow pan move, as is typically done to emphasize or deemphasize one or more aspects of a shot. During a slow pan, a visual artifact associated with an image quality transition may be relatively more noticeable. Accordingly, an image quality transition may not be preferred during the slow pan section of media clip 230(0).

Layer identifier 220(1) corresponds to a media clip 230(1) that includes a section where a product placement appears in a scene. A product placement involves a particular product, such as a beverage, piece of clothing, or other article, whose presence in a scene is paid for by a sponsor, such as the manufacturer of the product. Because the typical goal of a product placement is that the placed product is viewed in a favorable light, an image quality transition may be less favored when a placed product is visible in the scene. Accordingly, an image quality transition may not be preferred during the product placement section of media clip 230(1).

Layer identifier 220(2) corresponds to a media clip 230(2) that includes a section where a key character appears in a scene. The director or producer of the movie may prefer that an image quality not occur when a particular character is featured in a scene. Accordingly, an image quality transition may not be preferred during the key character section of media clip 230(2).

Layer identifier 220(3) corresponds to a media clip 230(3) that includes a section where the camera performs a whip pan move. A whip pan is a type of camera pan where the camera moves quickly in a horizontal direction, causing heavy blurring or streaking in the scene. During a whip pan, the background scene may be relatively indistinct. As a result, a visual artifact associated with an image quality transition may be relatively less noticeable during a whip pan. Accordingly, an image quality transition may be preferred during the whip pan section of media clip 230(3).

Layer identifier 220(4) corresponds to a media clip 230(4) that includes a section that features a key scene in the movie. The director or producer of the movie may prefer that an image quality not occur when a particular scene is presented. Accordingly, an image quality transition may not be preferred during the key scene section of media clip 230(4).

The final program 215 illustrates the finished media that has been edited using the clip layers 210. As shown, the final program 215 includes an edit decision list (EDL) 240 and the media content 250.

The EDL 240 is used to determine which clip layer appears in the final program at any given time. As such, the EDL essentially is a list of scene changes 260, where each change includes one or more time code values with corresponding scene change information associated with the time code values. For example, a scene change 260 could direct a change from media clip 230(0) to media clip 230(1) at a specified point in time. The EDL may include change information related to changes in any aspect of the final program 215, including, without limitation, the video or film image, audio, and graphics data. In some embodiments, the EDL may be produced automatically by a media editing application. In some embodiments, the EDL may be replaced or augmented by a timing information from a film log produced by a film editing application, or a manual log produced and entered by hand.

The media content 250 includes the finished media produced from the clip layers 210 using the time code-based entries in the EDL 240. As shown, the media content 250 includes clip segments 270 that are delineated by scene changes 260. The first clip segment 270(0) of the media content 250 includes a corresponding portion of media clip 230(0) associated with layer A. At scene change 260(0) the media content switches from the first clip segment 270(0) to the second clip segment 270(1) associated with layer B. The corresponding media clip 230(1) includes a product placement during the entire duration of the second clip segment 270(1).

At scene change 260(1) the media content switches from the second clip segment 270(1) to the third clip segment 270(2) associated with layer C. At scene change 260(2) the media content switches from the third clip segment 270(2) to the fourth clip segment 270(3) associated with layer A. The corresponding media clip 230(0) includes a slow pan that begins partially through the fourth clip segment 270(3) at time marker 280 and lasts until the end of the fourth clip segment 270(3). At scene change 260(3) the media content switches from the fourth clip segment 270(3) to the fifth clip segment 270(4) associated with layer C. The corresponding media clip 230(2) includes a key character during the entire duration of the fifth clip segment 270(4).

At scene change 260(4) the media content switches from the fifth clip segment 270(4) to the sixth clip segment 270(5) associated with layer D. The corresponding media clip 230(3) includes a whip pan during the entire duration of the sixth clip segment 270(5). At scene change 260(5) the media content switches from the sixth clip segment 270(5) to the seventh clip segment 270(6) associated with layer E. The corresponding media clip 230(4) includes a key scene during the entire duration of the seventh clip segment 270(6). At scene change 260(6) the media content switches from the seventh clip segment 270(6) to the eighth clip segment 270(7) associated with layer A.

The media content 250 may be augmented with data derived from scene changes 260 and various characteristics of the media clips 230. Such data associated with the media content 250 is referred to herein as metadata. In one embodiment, metadata corresponding to any or all scene changes 260 may be embedded into the media content 250. Such metadata may identify locations in the media content 250 where an image quality transition may be relatively less noticeable. Such locations may identify relatively preferred times to change image quality, if such a change is warranted. In another embodiment, metadata may be embedded into the media content 250, where such metadata may identify locations in the media content 250 where an image quality transition may be relatively more noticeable, and, therefore, less preferred.

In yet another embodiment, metadata corresponding to durations of time may be embedded into the media content 250. Such locations may identify time spans where a change in image quality is relatively less preferred or more preferred. These durations of time may be specified via a beginning and ending time code. Alternatively these durations may be specified via a single time code and a duration. For example, metadata could be embedded into the media content to indicate that an image quality transition is not preferred during clip segments 270(1), 270(4), and 270(6), corresponding to the product placement, key character, and key scene, respectively. Metadata could also be embedded into the media content to indicate that an image quality transition is not preferred during the portion of clip segment 270(3) corresponding to the slow pan. Metadata could also be embedded into the media content to indicate that an image quality transition is preferred during clip segment 270(5), corresponding to the whip pan.

The source for the metadata may be from any technically feasible source, including, without limitation, scene change data from an EDL, film log, or manual log; audio cues and effects; detection of particular objects or attributes in an image sequence; and input from a director or other content creator.

In one embodiment, the metadata may be embedded throughout the media content 250, where each metadata item is embedded at or before the corresponding location or duration of time in the media content 250. In another embodiment, the metadata may be embedded in a single header section at or near the beginning of the media content 250. In another embodiment, the metadata may be stored in a separate metadata file (not shown), or provided in any other technically feasible manner.

The metadata may include a reference to the relative priority or importance of the associated location or time duration. In one example, the metadata could include a text field or an enumerated type that indicates whether the metadata is associated with a scene change, slow pan, product placement, key character, whip pan, key scene, or some other type. In another example, the metadata could include a numeric value that indicates the strength of preference for making, or avoiding, a change in image quality at the corresponding location or duration of time. For example, the numeric value could vary between 0.0 and 1.0, where a higher value indicates a stronger preference for an image quality transition versus a lower value. In such a case, a streaming media provider would perform an image quality transition during the duration of time associated with the higher numeric value, if feasible.

As described, the metadata may be used to determine preferred image quality transition points, when such an image quality transition is warranted by a change in available streaming media bandwidth or other conditions. The metadata may be used for any other technically feasible application, such as to preemptively transition to a lower image quality level, resulting in a lower streaming transmission rate of the media content. Such a lower transmission rate may conserve communication channel bandwidth, reduce cost of transmitting the streaming media, or reduce power consumption of the transmitter or receiver of the media content.

Figure 3:
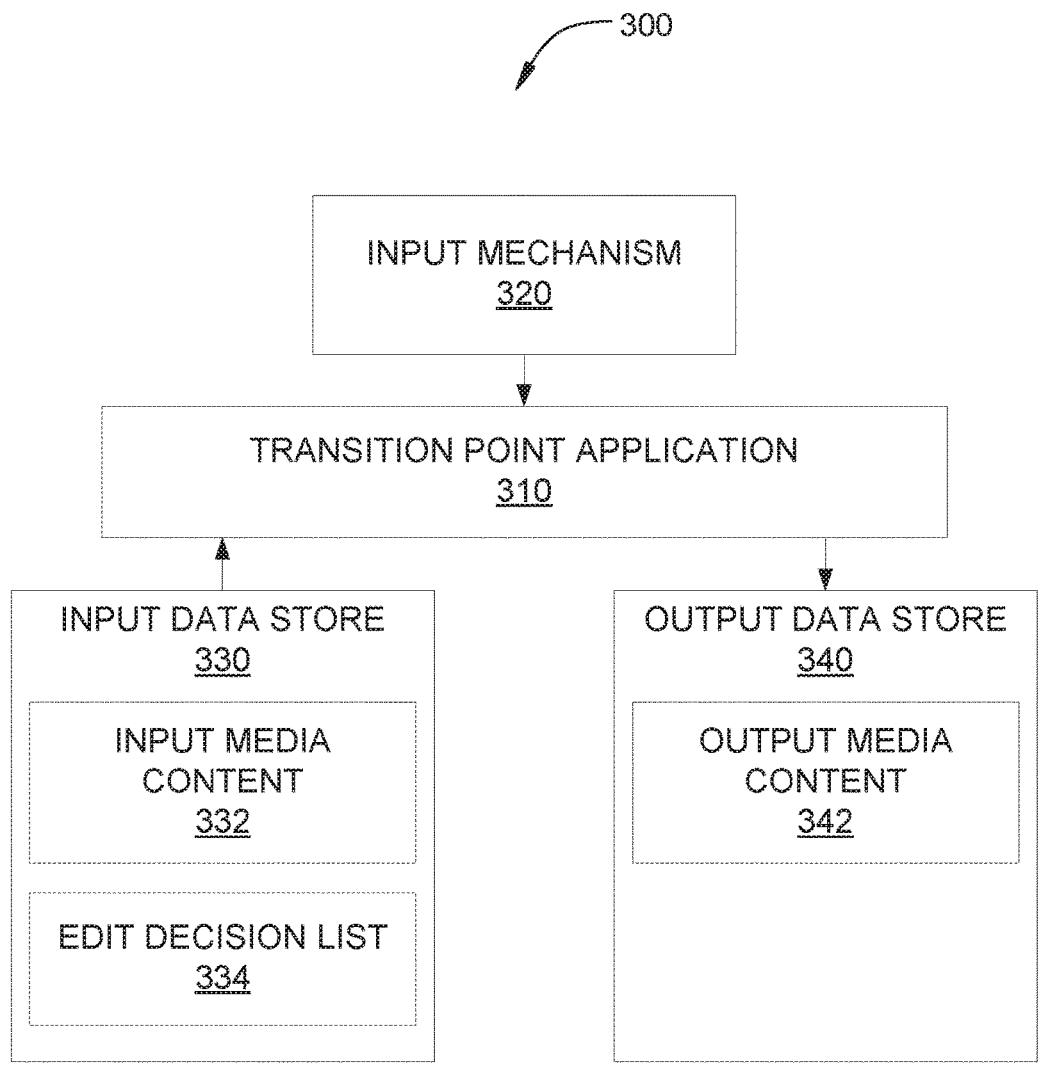
FIG. 3 illustrates a transition point system as may be implemented on the computing system of FIG. 1, according to one embodiment of the invention.

FIG. 3 illustrates a transition point system 300 as may be implemented on the computing system 100 of FIG. 1, according to one embodiment of the invention.

As shown, the transition point system 300 includes a transition point application 310, an input mechanism 320, an input data store 330, and an output data store 340.

The transition point application 310 is a software program including instructions that, when executed, performs the techniques described above in conjunction with FIG. 2. The transition point application 310 may reside in system memory 104 where the instructions of the software program may be retrieved and executed by the CPU 102.

The input mechanism 320 receives one or more input variables, such as a description including one or more beats, as described herein, and transmits the one or more input variables to the transition point application 310. For example, the input mechanism 320 could receive a manually entered log data, including time codes, for embedding in media content. The input mechanism 320 may also be used to receive qualitative preference data, such as whether a metadata entry is associated with a scene change, product placement, slow pan, key character, whip pan, or key scene. The input mechanism 320 may also be used to receive quantitative preference data, such as a value ranging from 0.0 to 1.0 indicating the relative preference for a transition in image quality level at the time corresponding to the metadata. The input mechanism 320 may provide data to the transition point application 310 via one or more input devices 108.

The input data store 330 provides input data to the transition point application 310. As shown, the input data store 330 includes input media content 332 and an edit decision list 334. The input media content 332 includes an edited program such as the media content 250 of FIG. 2 prior to embedding metadata. Multiple versions of the input media content 332 may be present in the input data store 330, where each version represents a different encoding rate associated with a different image quality level. In some embodiments, the multiple versions of the input media content 332 may also be associated with a different sound quality level of the input media content 332. The edit decision list 334 includes a list of scene change data such as the EDL 240 of FIG. 2. The input data store 330 may also include any other input information for the transition point application 310 including, without limitation, a film log (not shown). The input data store 330 may be located within the system disk 114.

The output data store 340 receives output data from the transition point application 310 for storage, streaming, or display. As shown, the output data store 340 includes output media content 342. The output media content 342 includes the edited program from the input media content 332 after the transition point application 310 has embedded metadata into the media content. The embedded metadata may include scene changes from the EDL 334, a film log, or through manual input via the input mechanism 320. Multiple versions of the output media content 342 at different encoding rates may be present in the output data store 330, each corresponding to a different encoded rate of the input media content 332 and with metadata embedded by the transition point application 310. The output media content 342 may be displayed on the display device 110 for viewing. The output media content 342 may also be streamed to one or more client media players via a communications channel.

The output data store 340 may also include any other output information for the transition point application 310 including, without limitation, a file (not shown) that includes metadata related to preferred transition points, without the corresponding media content. The output data store 340 may be located within the system disk 114. Alternatively, the output data store 340 may be located within a memory in a format suitable for display on the display device 110.

Figure 4:
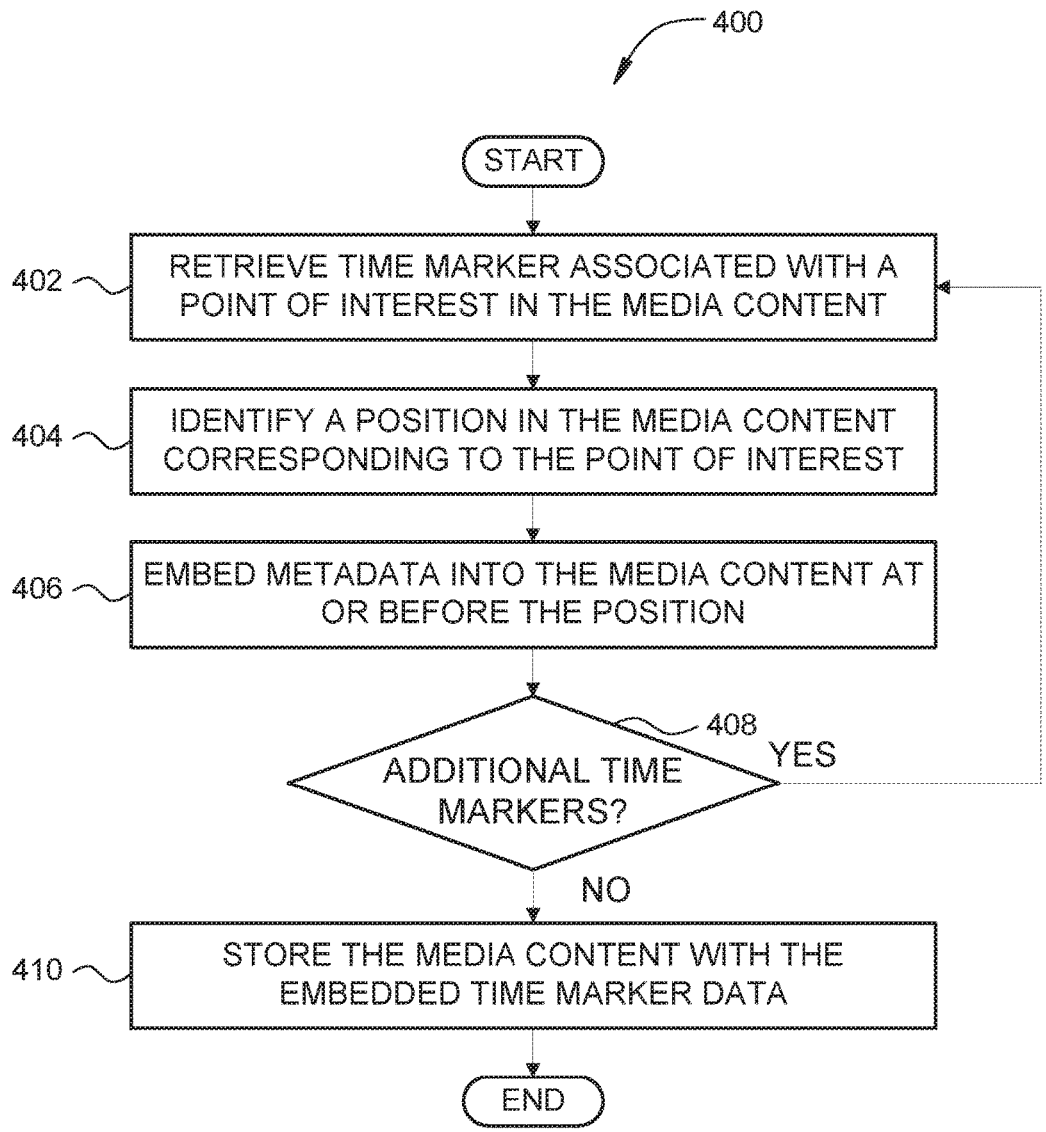
FIG. 4 sets forth a flow diagram of method steps for embedding transition points in media content with the system of FIG. 3, according to one embodiment of the invention.

FIG. 4 sets forth a flow diagram of method steps for embedding transition points in media content with the system of FIG. 3, according to one embodiment of the invention. Although the method steps are described in conjunction with the systems of FIGS. 1 and 3, persons skilled in the art will understand that any system configured to perform the method steps, in any order, falls within the scope of the present invention.

A method 400 begins at step 402, where the transition point system 300 retrieves a time marker associated with a point of interest in the media content. The time marker may be associated with a specific location in the media content or with a duration of time in the media content. The source of the time marker may be from any technically feasible source, including, without limitation, an edit decision list, a film log, or a manual entry. At step 404, the transition point system 300 identifies a position in the media content corresponding to the point of interest, via any technically feasible approach. For example, the transition point system 300 could identify a frame of video in the media content that corresponds to a time code, where the time code is equal to a time code associated with the time marker. A time code is a sequence of numeric codes, where each numeric code is associated with a different video frame or film frame in the media content. In another example, the transition point system 300 could identify a frame of video that is a given quantity of frames from the beginning of the media content, as specified by the time marker. At step 406, the transition point system 300 embeds metadata into the media content at or before the position of interest. At step 408, the transition point system 300 determines whether additional time markers remain to be embedded. If additional time markers remain to be embedded, then the method 400 proceeds to step 402, described above. If, however, no additional time markers remain to be embedded, then the method 400 proceeds to step 410, where the transition point system 300 stores the media content with the embedded time marker data. In some embodiments, the metadata is stored in a file separate from the media content rather than embedded into the media content. The method 400 then terminates.

Figure 5:
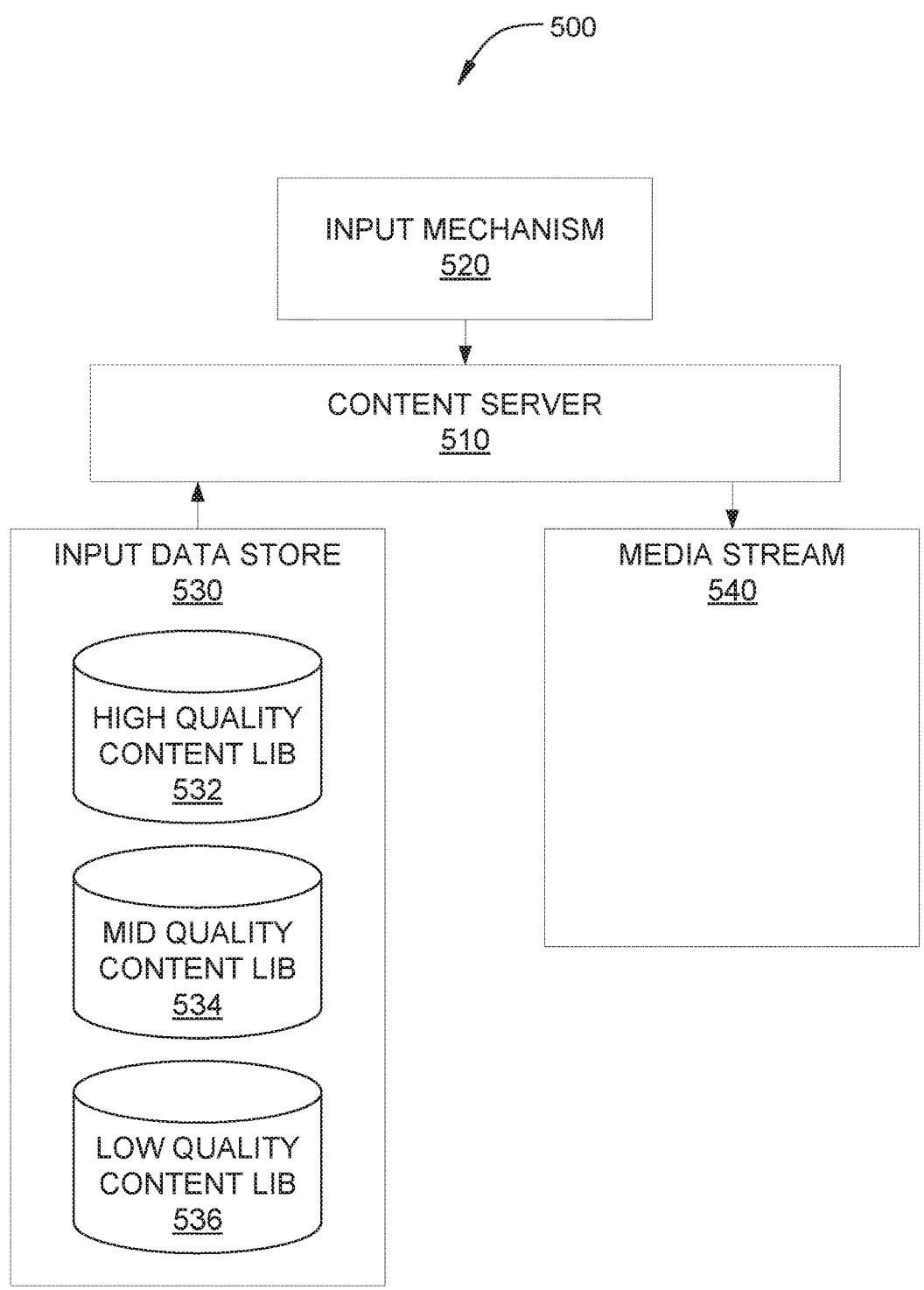
FIG. 5 illustrates a content server configured to transmit a media stream as may be implemented on the computing system of FIG. 1, according to one embodiment of the invention.

FIG. 5 illustrates a content provider system 500 configured to transmit a media stream as may be implemented on the computing system 100 of FIG. 1, according to one embodiment of the invention. As shown, the content provider system 500 includes a content server 510, an input mechanism 520, an input data store 530, and an output data store 540.

The content server 510 is computing device with a software program including instructions that, when executed, provides streaming media to one or more client media players over a communications channel. The content server 510 may reside in system memory 104 where the instructions of the software program may be retrieved and executed by the CPU 102.

The input mechanism 520 receives one or more input variables, such as the title of a piece of media content to transmit over a communications channel. The input mechanism 520 may be implemented in any technically feasible manner, including, without limitation, a command line interface, a batch or script file, a web-based application, or a graphical user interface. The input mechanism 520 may provide data to the content server 510 via one or more input devices 108.

The input data store 530 provides input data to the content server 510. As shown, the input data store 530 includes a high quality content library 532, a mid-level quality content library 534, and a low quality content library 536. The three content libraries 532, 534, 536 include one or more units of media content that are encoded at different data rates, or bit rates, corresponding to different image quality levels. For example, the high quality content library 532 could be encoded at 2500 kilobits per second (kbps), the mid-level quality content library 534 could be encoded at 300 kbps, and the low quality content library 536 could be encoded at 5 kbps. In some embodiments, the multiple content libraries may also be associated with a different sound quality level of the units of media content. Although shown with three content libraries at three different image quality levels, the input data store 530 could include any technically feasible quantity of content libraries, each corresponding to a different image quality level.

The input data store 530 may also include any other input information for the content server 510 including, without limitation, a separate metadata file (not shown) corresponding to media content that exists one or more of the high quality content library 532, mid-level quality content library 534, and low quality content library 536. The input data store 530 may be located within the system disk 114.

The media stream 540 provides a mechanism to transmit media content from the content server 510 to one or more client media players over a communications channel. The media streamer 540 may include a buffer (not shown) to hold media content temporarily, pending transmission to the communications channel.

In one example, the content server 510 could receive, via the input mechanism 520, a command to stream specific media content. The content server 510 could initially select the high image quality level, and could start reading the media content from the high quality content library 532. The content server 510 could then transmit the media content via the media stream 540 to a communications channel. The content server 510 could subsequently determine that the communication channel no longer has sufficient streaming capacity to complete transmission of the media content at the high image quality level. The content server 510 could determine from metadata associated with the media content that the communication channel has sufficient bandwidth to sustain transmission at the current image quality level until the next preferred transition point is reached. The content server 510 would then wait until the time of the next preferred transition point and then would transition to reading media content stored on the mid-level quality content library 534 or low-level quality content library (536). The content server 510 would begin streaming the mid-level quality media content or the low-level quality media content to the media stream 540, respectively.

The content server 510 could subsequently determine that the communication channel no longer has sufficient streaming capacity to complete transmission of the media content at the mid-level image quality level. The content server 510 could determine from metadata associated with the media content that the communication channel does not have sufficient bandwidth to sustain transmission at the current image quality level until the next preferred transition point is reached. The content server 510 would then transition to reading media content stored on the low quality content library 536 without waiting until the next preferred transition point. The content server 510 would then being streaming the low quality media content to the media stream 540.

The content server 510 could subsequently determine that the communication channel now has sufficient streaming capacity to complete transmission of the media content at the mid-level image quality. The content server 510 would then wait until the time of the next preferred transition point is reached and then would transition to reading media content stored on the mid-level quality content library 534. The content server 510 would then begin streaming the mid-level quality media content to the media stream 540. The process would continue until transmission of the selected media content completes, or the transmission of the selected media content is terminated.

In some embodiments, deferring an image quality transition until a later time may result in a larger image quality change at a later time. For example, the content provider system 400 could determine that the communication channel bandwidth has reduced such that the channel can sustain the current image quality level for an additional ten seconds. The content provider system 400 could immediately transition to a slightly lower image quality level to avoid an interruption in the streaming media service. Alternatively, the content provider system 400 could defer the image quality level reduction for five seconds, where a preferred transition point, such as a scene change, is identified. However, the content provider system 400 could determine that a more significant reduction in image quality level is now warranted in order to avoid a service interruption. Even so, a larger reduction in image quality level occurring at a scene change could be preferable to a smaller reduction in image quality during a critical scene.

Figure 6A:
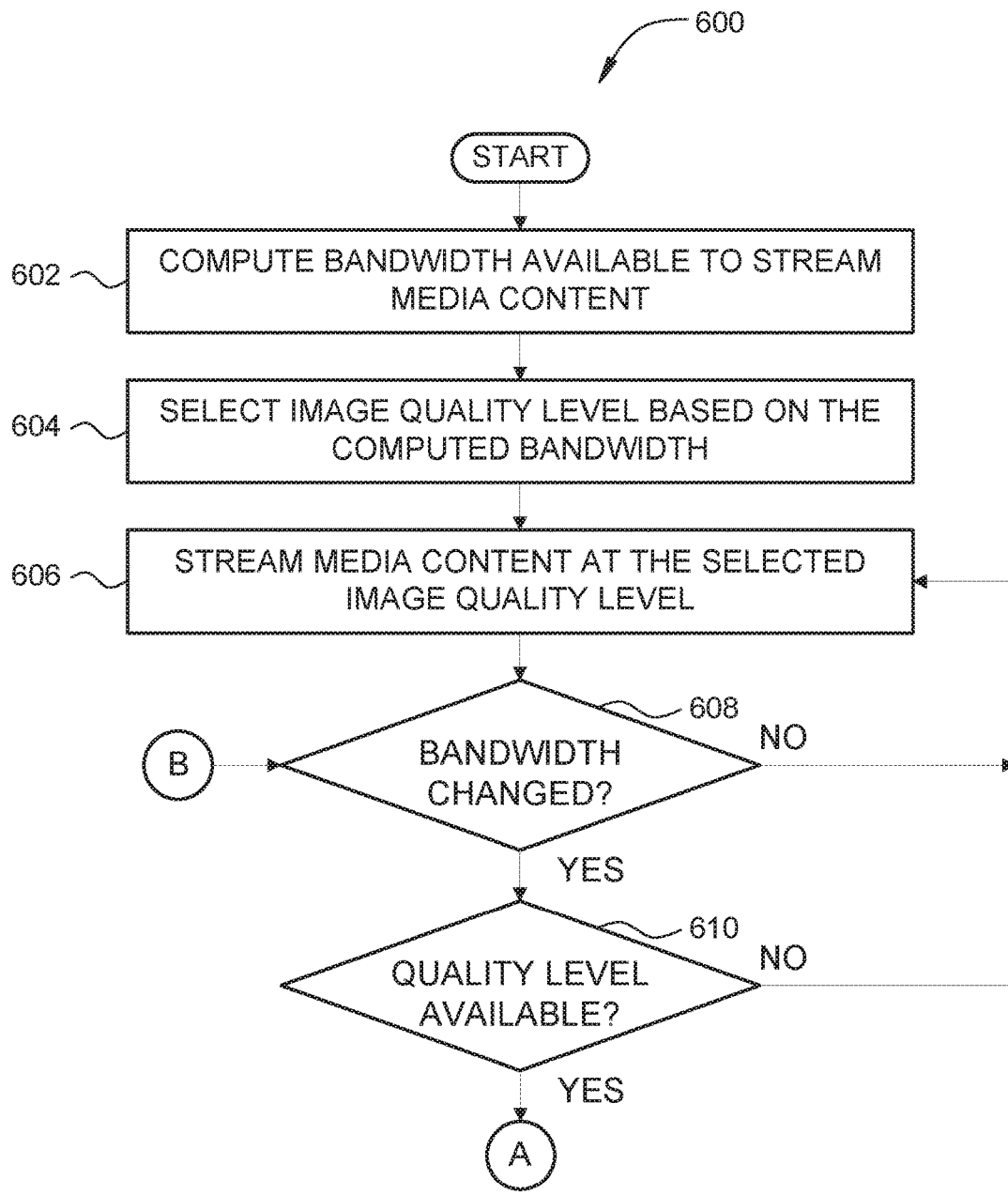
FIGS. 6A-6B set forth a flow diagram of method steps for transmitting a media stream that includes transition points with the system of FIG. 5, according to one embodiment of the invention.
Figure 6B:
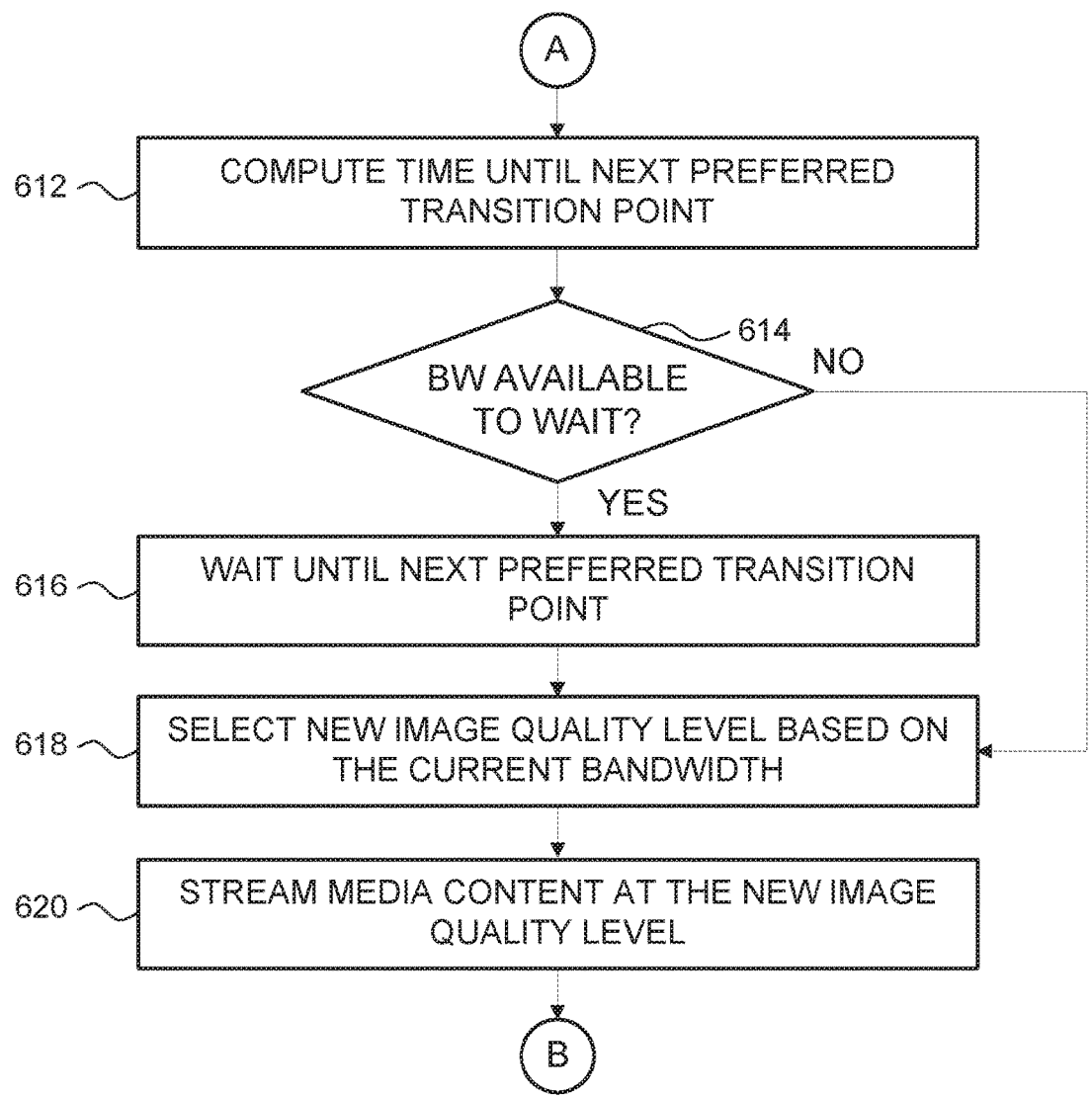

FIGS. 6A-6B set forth a flow diagram of method steps for transmitting a media stream that includes transition points with the system of FIG. 5, according to one embodiment of the invention. Although the method steps are described in conjunction with the systems of FIGS. 1 and 5, persons skilled in the art will understand that any system configured to perform the method steps, in any order, falls within the scope of the present invention.

A method 600 begins at step 602, where the content provider system 500 computes the bandwidth available to stream media content. The computation may be based on a number of factors, including, without limitation, dynamic characteristics of a communications channel, other demands on the bandwidth of the communications channel, and the bit rate of the streaming media content. At step 604, the content provider system 500 selects an image quality level based on the computed bandwidth. The image quality level corresponds to a media content library, where the media content stored in the media content library includes content for streaming at a given bit rate. At step 606, the content provider system 500 streams the media content at the selected image quality level.

At step 608, the content provider system 500 determines whether the bandwidth available to stream media via the communications channel has changed. In some embodiments, the content provider system 500 may also determine whether a client media player has sufficient buffer space to continue to stream media, based, for example, on a buffer state associated with the client media player. If the bandwidth has not changed, and, in some embodiments, the client media player has sufficient buffer space, then the method 600 proceeds to step 606, described above. If, however, the bandwidth has changed, or, in some embodiments, the client media player does not have sufficient buffer space, then the method 600 proceeds to step 610, where the content provider system 500 determines whether media content is available at an appropriate quality level. For example, if the bandwidth available to stream media content has decreased, then the content provider system 500 would determine whether media content is available at a lower quality level, corresponding to a lower bit rate. If the bandwidth available to stream media content has increased, then the content provider system 500 would determine whether media content is available at a higher quality level, corresponding to a higher bit rate. If media content is not available at an appropriate quality level, then the method 600 proceeds to step 606, described above.

If, however, media content is available at an appropriate quality level, then the method 600 proceeds to step 612, where the content provider system 500 computes the time until the next preferred transition point, as determined from metadata embedded in the media content or stored separately from the media content. At step 614, the content provider system 500 determines whether the bandwidth available to stream media content is sufficient that the content provider system 500 may wait until the preferred transition point without incurring a service interruption. If the bandwidth available to stream media content is sufficient, then the method 600 proceeds to step 616, where the content provider system 500 waits until the next preferred transition point in the media content being streamed.

At step 618, the content provider system 500 selects a new image quality level based on the current bandwidth available for streaming media content. At step 620, the content provider system 500 streams the media content at the newly selected image quality level. The method 600 then proceeds to step 608, described above. The content provider system 500 continues to stream the media content via the communications channel, adaptively transition quality level as appropriate, until all of the media content is streamed, or streaming is interrupted for a particular reason, such as a command to terminate streaming received from a user.

Returning to step 614, if the bandwidth available to stream media content is not sufficient, then the method 600 proceeds to step 618, described above.

It will be appreciated that the system shown herein is illustrative and that variations and modifications are possible. For example, the approaches disclosed herein are described in the context of streaming media. However, these approaches could be implemented in any environment where the bandwidth available for media content is adaptive to dynamic changes in a communications channel or where limited resources are available for decoding or rendering a stream of data. In another example, the content provider could look forward into the media content in order to predict the next two, three, or more quality transition points. The content provider would not be restricted to select only the next quality transition point.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In sum, transition points are embedded in streaming media, where the transition points are accessible to a content provider. The transition points may be manually generated or automatically generated. Alternatively, the transition points may be any combination of manually generated and automatically generated transition points. The transition points provide guidance to a content provider system as to when to transition from one quality level to another quality level. Such transition points may identify either a point in time or a time range. Transition points may identify point or range in time where a transition in image or sound quality level is preferred. Alternatively, transition points may identify point or range in time where a transition in image or sound quality level is not preferred. If a content provider system detects an impending change in available communications channel bandwidth, then the content provider system analyzes transition points near the time of the impending bandwidth change. If feasible, the content provider system changes the quality level of the streaming media at an appropriate transition point. As a result, quality level changes occur at less noticeable points in the streaming media, rather than at more critical points, thus improving the viewing experience of the end-user.

While the foregoing is directed to embodiments of the present invention, other and further embodiments of the invention may be devised without departing from the basic scope thereof, and the scope thereof is determined by the claims that follow.

What is claimed is:

1. A computer-implemented method to reduce noticeability of quality level changes during streaming of media content, based on transition points, the computer-implemented method comprising:
providing a predefined set of values ranging from explicitly characterizing weakest candidacy as a transition point to explicitly characterizing strongest candidacy as a transition point;
retrieving a time marker associated with a point of interest in the media content;
identifying a first position within the media content corresponding to the point of interest;
generating, by operation of one or more computer processors, a transition marker specifying a value that explicitly characterizes a candidacy of the point of interest as a transition point, wherein the specified value is selected from the predefined set of values, wherein the transition marker is embedded into the media content at a second position that is no later in time than the first position; and
during streaming of the media content, causing a client media player to transition from an initial image quality level to a target image quality level at a point in time determined based on the transition marker, in order to reduce noticeability of the transition, wherein the target image quality level is determined based on a measure of available bandwidth.

2. The computer-implemented method of claim 1, wherein the first position is equal to the second position.

3. The computer-implemented method of claim 1, wherein the transition marker specifies a location within the media content where a transition is preferred.

4. The computer-implemented method of claim 1, wherein the transition marker specifies a duration of time within the media content where a transition is not preferred.

5. The computer-implemented method of claim 1, wherein retrieving the time marker comprises receiving the time marker from a user.

6. The computer-implemented method of claim 1, wherein the initial image quality level comprises a first image quality level, wherein the target image quality level comprises a second image quality level, wherein the transition marker is generated by a content server operatively connected to the client media player via a communications channel for streaming the media content, wherein the transition marker further specifies an enumerated type explicitly characterizing whether the point of interest is a scene change, slow pan, product placement, key character, whip pan, or key scene; wherein each enumerated type, selected from a scene change, slow pan, product placement, key character, whip pan, and key scene, is specifiable in the transition marker; wherein the second image quality level is different from the first image quality level, wherein the second image quality level is one of: (i) higher than the first image quality level and (ii) lower than the first image quality level; wherein the predefined set of values comprises a predefined set of numerical values ranging from explicitly characterizing weakest candidacy as a transition point to explicitly characterizing strongest candidacy as a transition point, wherein the specified value comprises one of the predefined set of numerical values.

7. The computer-implemented method of claim 6, wherein the computer-implemented method further comprises:
determining a measure of available bandwidth, based on at least two of: (i) a maximum capacity of the communications channel; (ii) a measure of current utilization of bandwidth of the communications channel; (iii) and a bit rate of the media content;
preemptively transitioning to a first lower image quality level based on the transition marker and despite sufficient bandwidth and processing power being available to avoid transitioning to the first lower image quality level, in order to reduce power consumption and transmission cost associated with streaming the media content;
wherein the client media player is caused to:
in transitioning between image quality levels during streaming of the media content, prioritize a larger reduction in image quality level occurring at higher-candidacy transition point over a smaller reduction in image quality level occurring at a lower-candidacy transition point.

8. The computer-implemented method of claim 7, wherein the first position is identified based on a time code corresponding to the time marker; wherein each content type, selected from: (i) a cut point within the media content; (ii) an object being visible in a scene of the media content; and (iii) a type of camera move; is identifiable by the transition marker; wherein the computer-implemented method further comprises:
storing the media content on a computer-readable medium, wherein the media content comprises an output of the retrieving, identifying, and generating steps;
wherein the client media player is operable to:
determine a measure of available buffer space on the client media player; and
upon determining that the measure of available buffer space falls below a predefined threshold, transition to a second lower image quality level despite sufficient bandwidth and processing power being available to avoid transitioning to the second lower image quality level.

9. The computer-implemented method of claim 8, wherein each target type selected from: (i) a location within the media content where a transition is preferred; and (ii) a duration of time within the media content where a transition is not preferred; is specifiable in the transition marker;
wherein the time marker is generable based on each marker element selected from: (i) an edit decision list; (ii) the enumerated type; (iii) audio cues from the media content; and (iv) detection of specified objects in the media content.

10. The computer-implemented method of claim 9, wherein the predefined set of values includes at least three distinct values, wherein the first position is one of: (ii) equal to the second position and (ii) later in time than the second position; wherein the time marker is generated based on: (i) the edit decision list; (ii) the enumerated type; (iii) the audio cues from the media content; and (iv) the detection of the specified objects in the media content.

11. A non-transitory computer-readable medium including instructions executable to perform an operation to reduce noticeability of quality level changes during streaming of media content, based on transition points, the operation comprising:
providing a predefined set of values ranging from explicitly characterizing weakest candidacy as a transition point to explicitly characterizing strongest candidacy as a transition point;
retrieving a time marker associated with a point of interest in the media content;

identifying a first position within the media content corresponding to the point of interest;

generating, by operation of one or more computer processors when executing the instructions, a transition marker specifying a value that explicitly characterizes a candidacy of the point of interest as a transition point, wherein the specified value is selected from the predefined set of values, wherein the transition marker is embedded into the media content at a second position that is no later in time than the first position; and during streaming of the media content, causing a client media player to transition from an initial image quality level to a target image quality level at a point in time determined based on the transition marker, in order to reduce noticeability of the transition, wherein the target image quality level is determined based on a measure of available bandwidth.

12. The non-transitory computer-readable medium of claim 11, wherein the first position is equal to the second position.

13. The non-transitory computer-readable medium of claim 11, wherein the transition marker specifies a location within the media content where a transition is preferred.

14. The non-transitory computer-readable medium of claim 11, wherein the transition marker specifies a duration of time within the media content where a transition is not preferred.

15. The non-transitory computer-readable medium of claim 11, wherein retrieving the time marker comprises receiving the time marker from a user.

16. A computing system to reduce noticeability of quality level changes during streaming of media content, based on transition points, the computing system comprising:

a memory that is configured to store instructions for a program; and a processor that is configured to execute the instructions for the program to perform an operation comprising:

providing a predefined set of values ranging from explicitly characterizing weakest candidacy as a transition point to explicitly characterizing strongest candidacy as a transition point;

retrieving a time marker associated with a point of interest in the media content;

identifying a first position within the media content corresponding to the point of interest;

generating a transition marker specifying a value that explicitly characterizes a candidacy of the point of interest as a transition point, wherein the specified value is selected from the predefined set of values, wherein the transition marker is embedded into the media content at a second position that is no later in time than the first position; and during streaming of the media content, causing a client media player to transition from an initial image quality level to a target image quality level at a point in time determined based on the transition marker, in order to reduce noticeability of the transition, wherein the target image quality level is determined based on a measure of available bandwidth.

17. The computing system of claim 16, wherein the first position is equal to the second position.

18. The computing system of claim 16, wherein the transition marker specifies a location within the media content where a transition is preferred.

19. The computing system of claim 16, wherein the transition marker specifies a duration of time within the media content where a transition is not preferred.

20. The computing system of claim 16, wherein retrieving the time marker comprises receiving the time marker from a user.

* * * * *

UNITED STATES PATENT AND TRADEMARK OFFICE
CERTIFICATE OF CORRECTION

PATENT NO. : 10,264,046 B2  
APPLICATION NO. : 15/636224  
DATED : April 16, 2019  
INVENTOR(S) : Dominic Glynn Page 1 of 1

It is certified that error appears in the above-identified patent and that said Letters Patent is hereby corrected as shown below:

In the Claims

In Column 16, Line 51, in Claim 10, delete "(ii)" and insert -- (i) --, therefor.

Signed and Sealed this  
Third Day of September, 2019

Andrei Iancu  
*Director of the United States Patent and Trademark Office*